United States Patent
Goren et al.

(10) Patent No.: US 7,762,464 B2
(45) Date of Patent: Jul. 27, 2010

(54) CONTROL OF SPECULAR REFLECTION IN IMAGING READER

(75) Inventors: David P. Goren, Smithtown, NY (US); Vladimir Gurevich, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 516 days.

(21) Appl. No.: 11/823,819

(22) Filed: Jun. 28, 2007

(65) Prior Publication Data

US 2009/0001175 A1    Jan. 1, 2009

(51) Int. Cl.
*G06K 7/10* (2006.01)
*G08C 21/00* (2006.01)

(52) U.S. Cl. .................. 235/462.06; 235/462.05; 235/462.09; 235/462.11

(58) Field of Classification Search .................. 235/462.01–462.49
See application file for complete search history.

(56) References Cited

U.S. PATENT DOCUMENTS

| | | | |
|---|---|---|---|
| 4,613,895 A | 9/1986 | Burkey et al. | |
| 4,794,239 A | 12/1988 | Allais | |
| 5,059,779 A | 10/1991 | Krichever et al. | |
| 5,124,539 A | 6/1992 | Krichever et al. | |
| 5,200,599 A | 4/1993 | Krichever et al. | |
| 5,304,786 A | 4/1994 | Pavlidis et al. | |
| 5,703,349 A | 12/1997 | Meyerson et al. | |
| 6,192,166 B1 | 2/2001 | Mori et al. | |
| 6,206,288 B1 * | 3/2001 | May et al. | 235/462.11 |
| 6,935,563 B2 * | 8/2005 | Okada et al. | 235/454 |
| 2002/0070278 A1 * | 6/2002 | Hung et al. | 235/472.01 |
| 2002/0075526 A1 * | 6/2002 | Mori | 235/455 |
| 2002/0146169 A1 * | 10/2002 | Sukthankar et al. | 382/170 |
| 2005/0087603 A1 * | 4/2005 | Koenck et al. | 235/472.02 |
| 2006/0118627 A1 | 6/2006 | Joseph et al. | |
| 2006/0163355 A1 | 7/2006 | Olmstead et al. | |
| 2006/0283952 A1 * | 12/2006 | Wang | 235/462.01 |

FOREIGN PATENT DOCUMENTS

WO    03030082 A    4/2003

OTHER PUBLICATIONS

International Preliminary Report on Patentability and the Written Opinion of the International Searching Authority for International Application No. PCT/US2008/068818 dated Jan. 5, 2010.

* cited by examiner

*Primary Examiner*—Thien Minh Le
*Assistant Examiner*—Christle I Marshall

(57) ABSTRACT

Electro-optical reading failure to read indicia due to specular reflection in the return light captured by a solid-state imager is prevented. An illuminator illuminates the indicia during reading with illumination light directed from an illuminating light source. In one embodiment, a controller is operative for detecting saturation in a captured image, and for reducing an intensity of the illumination light upon detection of the saturation. In another embodiment, the controller captures the return light in successive frames, and causes the illumination light to illuminate the indicia only during some of the frames. In yet another embodiment, the controller turns the illumination light on and off at a flash rate, and signals a user by changing the flash rate upon detection of the saturation to move a housing that supports the imager, illuminator and controller.

12 Claims, 2 Drawing Sheets

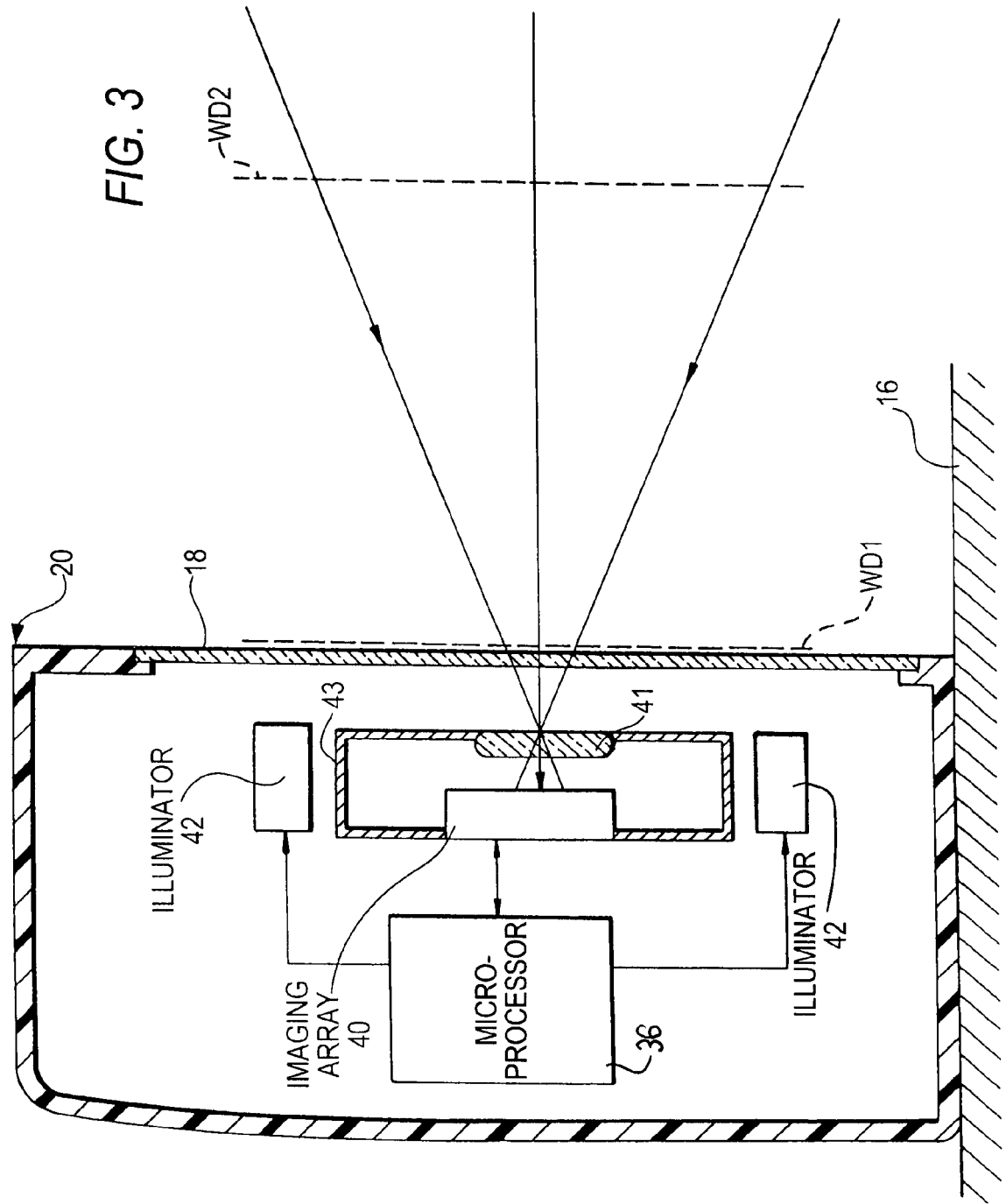

CONTROL OF SPECULAR REFLECTION IN IMAGING READER

DESCRIPTION OF THE RELATED ART

Flat bed laser readers, also known as horizontal slot scanners, have been used to electro-optically read one-dimensional bar code symbols, particularly of the Universal Product Code (UPC) type, at a point-of-transaction workstation in supermarkets, warehouse clubs, department stores, and other kinds of retailers for many years. As exemplified by U.S. Pat. Nos. 5,059,779; 5,124,539 and 5,200,599, a single, generally horizontal window is set flush with, and built into, a generally horizontal countertop of the workstation. Products to be purchased bear an identifying symbol and are typically slid or swiped across the generally horizontal window through which a multitude of scan lines in a scan pattern is projected in a generally upward direction. Each scan line is generated by sweeping a laser beam from a laser. When at least one of the scan lines sweeps over a symbol associated with a product, the symbol is processed and read, and the product is identified.

Instead of, or in addition to, a horizontal slot scanner, it is known to provide a vertical slot scanner, which is typically a portable reader placed on the countertop such that its window is generally vertical and faces an operator at the workstation. The generally vertical window is oriented generally perpendicularly to the horizontal window, or is slightly rearwardly inclined. A scan pattern generator within the vertical slot scanner also sweeps a laser beam and projects a multitude of scan lines in a scan pattern in a generally outward direction through the generally vertical window toward the operator. The operator slides or swipes the products past either window from right to left, or from left to right, in a "swipe" mode. Alternatively, the operator merely presents the symbol on the product to the center of either window in a "presentation" mode. The choice depends on operator preference or on the layout of the workstation.

These point-of-transaction workstations have been long used for processing transactions involving products associated with one-dimensional symbols each having a row of bars and spaces spaced apart along one direction, and for processing two-dimensional symbols, such as Code 39, as well. Code 39 introduced the concept of vertically stacking a plurality of rows of bar and space patterns in a single symbol. The structure of Code 39 is described in U.S. Pat. No. 4,794,239. Another two-dimensional code structure for increasing the amount of data that can be represented or stored on a given amount of surface area is known as PDF417 and is described in U.S. Pat. No. 5,304,786.

Both one- and two-dimensional symbols can also be read by employing solid-state imagers to capture an image of each symbol, instead of moving a laser beam across each symbol in a scan pattern. For example, the imager may comprise a one- or two-dimensional array of cells or photosensors, which correspond to image elements or pixels in a field of view of the imager. Such an array may be comprised of a one- or two-dimensional charge coupled device (CCD) or a complementary metal oxide semiconductor (CMOS) device, analogous to those devices used in a digital camera to capture images. The imager further includes electronic circuitry for producing electrical signals indicative of the light captured by the array, and a microprocessor for processing the electrical signals to produce each captured image.

It is therefore known to use a solid-state imager for capturing a monochrome image of a symbol as, for example, disclosed in U.S. Pat. No. 5,703,349. It is also known to use a solid-state imager with multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

It is also known to energize an illuminator associated with the imager-based reader to illuminate the symbol during its reading with illumination light emitted from an illumination light source and directed to the symbol for reflection therefrom. The illumination light source may be located within and/or externally of the reader, and is preferably at least one light emitting diode (LED), and may include a plurality of LEDs.

However, a problem associated with the imager-based reader involves a so-called dead zone or area within the field of view of the imager in which specular reflection may prevent a successful image capture and reading of the symbol. When the illumination light impinges on a surface, such as a symbol on a label, the reflected illumination light has a specular component and a scattered component. The scattered component radiates in all directions, but the specular component, on the other hand, is a mirror-like reflection wherein the illumination light is reflected according to the principle that the angle of reflection is equal to the angle of incidence. The specular component is a major constituent of the reflected illumination light, and its intensity is dependent on surface finish of the symbol. The specular component, also called glare, is typically too bright, particularly when a symbol is printed on a label having a glossy finish or overlaid with cellophane or film packaging, or when diffractive security marks are provided. Specular reflection need not only be caused by illumination light emitted by an illumination light source supported by the reader, but can also be caused by ambient illumination light, such as sunlight or local light sources in the environment. The specular component, whether originating from ambient light and/or from a light source supported by the reader, can overload, saturate, and "blind" the imager so that the reader fails to read the obscured image.

When the imager-based reader is held by a user, and is pointed at a symbol, the untrained user expects the reader to work best when the illumination light passing through an on-board window is aimed at a right angle to a plane in which the symbol lies. The user tends to hold the reader so that the window is approximately parallel to that plane. However, this is the very position where the dead zone is centered and has its maximum effect, because specular light striking the symbol at an incidence angle of about 90 degrees will return at a reflection angle of about 90 degrees, thereby saturating the imager.

Although the known imager-based readers are generally satisfactory for their intended purpose, it would be desirable to minimize the dead zone for both hand-held and hands-free readers, and enable even the untrained user to manipulate a hand-held reader in an expected manner without causing the reader to fail to read due to specular reflection.

SUMMARY OF THE INVENTION

One feature of the present invention resides, briefly stated, in a reader for, and a method of, electro-optically reading indicia, especially one- and/or two-dimensional symbols. Each symbol includes elements of different light reflectivity, i.e., bars and spaces. The reader could be configured as a hands-free and/or a hand-held housing having a window. The housing may have a handle for hand-held operation and/or a base for supporting the housing on a support surface for hands-free operation. In some applications, the window could be omitted, in which event, the reader has a windowless opening at which the indicia are located for reading. As used herein, the term "presentation area" is intended to cover both a window and a windowless opening. In the case of the hands-free reader, the symbol is swiped past, or presented to, the presentation area and, in the case of the hand-held reader, the reader itself is moved and the presentation area is aimed at the symbol. In the preferred embodiments, the reader is installed in a retail establishment, such as a supermarket, especially in a cramped environment.

A one- or two-dimensional, solid-state imager is mounted in the reader, and includes an array of image sensors operative for capturing light from a one- or two-dimensional symbol or target through the presentation area during the reading to produce a captured image. Preferably, the array is a CCD or a CMOS array.

When the reader is operated in low light or dark ambient environments, an illuminator is also supported either inside and/or outside the reader and illuminates the symbol during the reading with illumination light directed from an illumination light source through the presentation area. The illumination light source preferably comprises one light emitting diode (LED), and may include a plurality of LEDs.

In accordance with one aspect of this invention, a controller is also provided in the housing, for resisting reading failure due to specular reflection in the return light captured by the imager. As discussed above, specular reflection, also called glare, is typically caused when incident light strikes a symbol printed on a label having a glossy finish or overlaid with cellophane or film packaging, or when diffractive security marks are provided. The incident light can originate from the illumination light emitted by the illumination light source and/or from ambient light, such as sunlight or by local light sources in the environment. The specular reflection, whether originating from ambient light and/or from a light source supported by the reader, can overload, saturate, and "blind" the imager so that the reader fails to read the obscured image.

In one embodiment, the controller is operatively connected to the imager and the illuminator, for detecting saturation, e.g., a bright spot, in the captured image, and for reducing an intensity of the illumination light upon detection of the saturation. Preferably, the controller is operative for entirely shutting off the illumination light upon detection of the saturation. In this case, the image will be captured using only ambient light.

In another embodiment, the controller is operatively connected to the imager and the illuminator, for capturing the return light in successive frames, and for causing the illumination light to illuminate the indicia only during some of the frames. Preferably, the controller periodically energizes the illuminator to cause the illumination light to illuminate the indicia during first ones of the frames, and periodically deenergizes the illuminator to cause the illumination light not to illuminate the indicia during second ones of the frames, which alternate with the first ones of the frames. In other words, sequential frames are taken with and without the illumination light. If specular reflection exists in the frame in which the illumination light is present, then it will probably not exist in the next frame in which the illumination light is absent. In this case, saturation of the image is not detected or required.

In still another embodiment, the controller is operatively connected to the imager and the illuminator, for again detecting saturation in the captured image, for turning the illumination light on and off at a flash rate visible to a user, and for signaling the user by changing the flash rate upon detection of the saturation to move the housing. As discussed above, the user may hold the reader in the very position where the specular reflection has its maximum effect, because specular light striking the symbol at an incidence angle of about 90 degrees will return at a reflection angle of about 90 degrees, thereby saturating the imager. The changing of the flash rate visually advises the user to move the reader to a different position, thereby reducing, if not eliminating, the specular reflection. This embodiment is especially useful when the specular reflection is caused by ambient light.

In accordance with another aspect of this invention, the method of electro-optically reading indicia, comprises the steps of capturing return light from the indicia during reading with an imager to produce a captured image; and resisting reading failure due to specular reflection in the return light captured by the imager.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a block diagram of various components of the reader of FIG. 1.

DETAILED DESCRIPTION OF THE PREFERRED EMBODIMENTS

Figure 1:
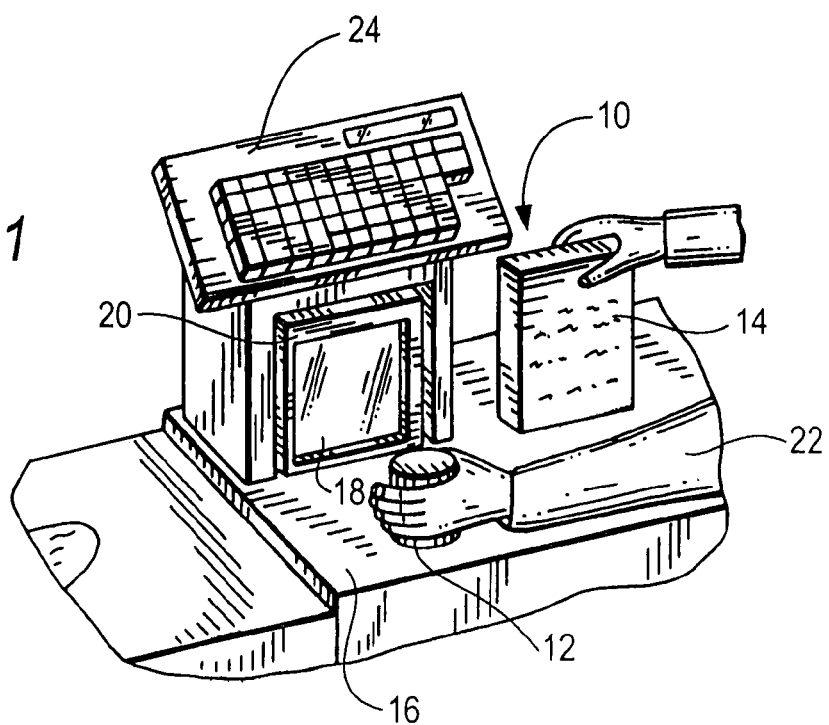
FIG. 1 is a perspective view of a point-of-transaction reader operative in an illustrated hands-free mode for capturing light from symbol-bearing targets in accordance with this invention.

Reference numeral 10 in FIG. 1 generally identifies a workstation for processing transactions and specifically a checkout counter at a retail site at which products, such as a can 12 or a box 14, each bearing a target symbol, are processed for purchase. The counter includes a countertop 16 across which the products are slid at a swipe speed past a generally vertical window (i.e., presentation area) 18 of a box-shaped, portable, vertical slot reader 20 mounted on the countertop 16. A checkout clerk or operator 22 is located at one side of the countertop, and the reader 20 is located at the opposite side. A cash/credit register 24 is located within easy reach of the operator. In the frequent event that large, heavy, or bulky products, that cannot easily be brought to the reader 20, have target symbols that are required to be read, then the operator 22 may also manually grasp the portable reader 20 and lift it off, and remove it from, the countertop 16 for reading the target symbols in a hand-held mode of operation. The reader need not be box-shaped as illustrated, but could have virtually any housing configuration, such as a gun shape.

Figure 2:
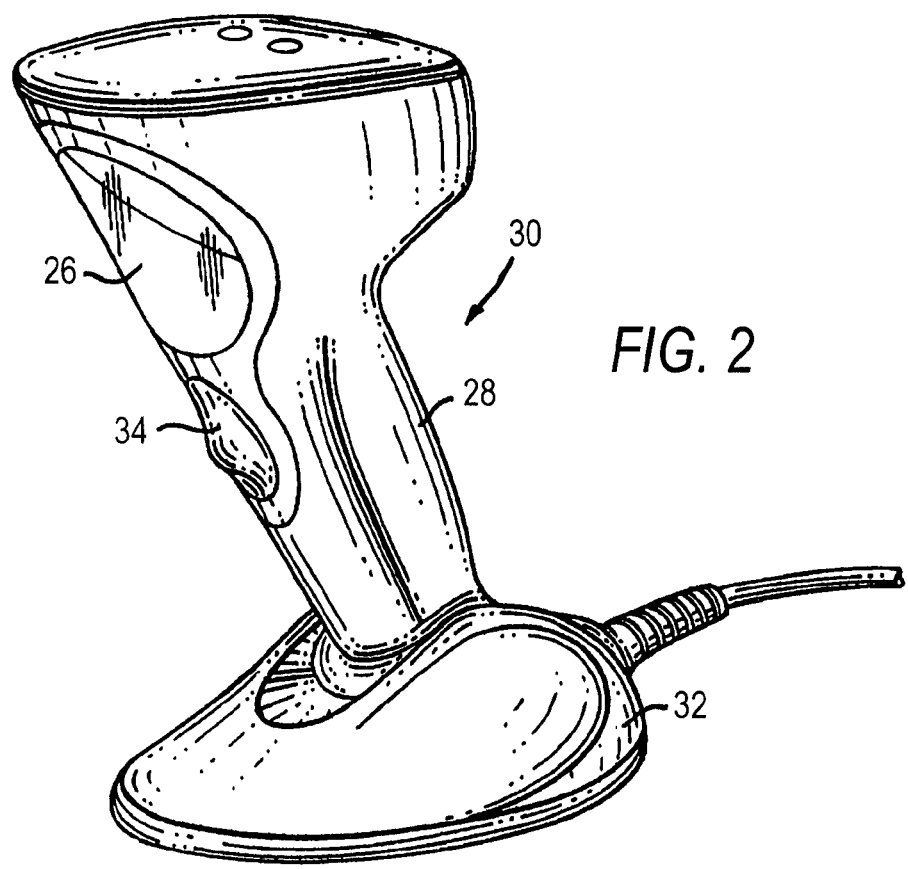
FIG. 2 is a perspective view of an electro-optical reader operative in either a hand-held mode, or a hands-free mode, for capturing light from symbol-bearing targets in accordance with this invention.

Reference numeral 30 in FIG. 2 generally identifies another reader having a different configuration from that of reader 20. Reader 30 also has a generally vertical window (i.e., presentation area) 26 and a gun-shaped housing 28 supported by a base 32 for supporting the reader 30 on a countertop. The reader 30 can thus be used as a stationary workstation in which products are slid or swiped past the vertical window 26, or can be picked up off the countertop and held in the operator's hand and used as a handheld reader in which a trigger 34 is manually depressed to initiate reading of the symbol.

As schematically shown in FIG. 3, an imager 40 and an imaging lens assembly 41 are mounted in an enclosure 43 in either reader, such as the reader 20. The imager 40 is a solid-state device, for example, a CCD or a CMOS imager and has an array of addressable image sensors operative for capturing light through the window 18 from a target, for example, a one- or two-dimensional symbol, over a field of view and located in a working range of distances between a close-in working distance (WD1) and a far-out working distance (WD2). In a preferred embodiment, WD1 is about two inches from the imager array 40 and generally coincides with the window 18, and WD2 is about eight inches from the window 18. An illuminator is also mounted in the reader and preferably includes a single light source, e.g., a light emitting diode (LED) 42, or perhaps a plurality of LEDs 42, arranged at opposite sides of the imager 40 to uniformly illuminate the target.

As shown in FIG. 3, the imager 40 and the illuminator LEDs 42 are operatively connected to a controller or microprocessor 36 operative for controlling the operation of these components. Preferably, the microprocessor is the same as the one used for decoding light scattered from the indicia and for processing and analyzing the captured target images.

In operation, the microprocessor 36 sends a command signal to pulse the illuminator LEDs 42 for a short time period, say 500 microseconds or less, and energizes the imager 40 to collect light from a target symbol only during said time period. A typical array needs about 33 milliseconds to read the entire target image and operates at a frame rate of about 30 frames per second. The array may have on the order of one million addressable image sensors.

In accordance with one aspect of this invention, the controller 36 is provided in the reader 20, for resisting reading failure due to specular reflection in the return light captured by the imager 40. As discussed above, specular reflection, also called glare, is typically caused when incident light strikes a symbol printed on a label having a glossy finish or overlaid with cellophane or film packaging, or when diffractive security marks are provided. The incident light can originate from the illumination light emitted by the illumination light source and/or from ambient light, such as sunlight or by local light sources in the environment. The specular reflection, whether originating from ambient light and/or from a light source supported by the reader, can overload, saturate, and "blind" the imager 40 so that the reader fails to read the obscured image.

In one embodiment, the controller 36 is operatively connected to the imager 40 and the illuminator 42, for detecting saturation, e.g., a bright spot, in the captured image, and for reducing an intensity of the illumination light upon detection of the saturation. Preferably, the controller 36 is operative for entirely shutting off the illumination light upon detection of the saturation. In this case, the image will be captured using only ambient light.

In another embodiment, the controller 36 is again operatively connected to the imager 40 and the illuminator 42, for capturing the return light in successive frames, and for causing the illumination light to illuminate the indicia only during some of the frames. Preferably, the controller 36 periodically energizes the illuminator 42 to cause the illumination light to illuminate the indicia during first ones of the frames, and periodically deenergizes the illuminator 42 to cause the illumination light not to illuminate the indicia during second ones of the frames, which alternate with the first ones of the frames. In other words, sequential frames are taken with and without the illumination light. If specular reflection exists in the frame in which the illumination light is present, then it will probably not exist in the next frame in which the illumination light is absent. In this case, saturation of the image is not detected or required.

In still another embodiment, the controller 36 is also operatively connected to the imager 40 and the illuminator 42, for again detecting saturation in the captured image, for turning the illumination light on and off at a flash rate visible to a user, and for signaling the user by changing the flash rate upon detection of the saturation to move the reader 20. As discussed above, the user may hold the reader in the very position where the specular reflection has its maximum effect, because specular light striking the symbol at an incidence angle of about 90 degrees will return at a reflection angle of about 90 degrees, thereby saturating the imager 40. The changing of the flash rate visually advises the user to move the reader to a different position, thereby reducing, if not eliminating, the specular reflection. This embodiment is especially useful when the specular reflection is caused by ambient light.

In accordance with another aspect of this invention, the method of electro-optically reading indicia, comprises the steps of capturing return light from the indicia during reading with an imager 40 to produce a captured image; and resisting reading failure due to specular reflection in the return light captured by the imager 40.

It will be understood that each of the elements described above, or two or more together, also may find a useful application in other types of constructions differing from the types described above. Thus, readers having different configurations can be used.

While the invention has been illustrated and described as controlling specular reflection in an imaging reader and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A reader for electro-optically reading indicia, comprising:
    a housing;
    a solid-state imager in the housing and including an array of image sensors for capturing return light from the indicia during reading to produce a captured image;
    a controller for resisting reading failure due to specular reflection in the return light captured by the imager;
    an illuminator supported by the housing for illuminating the indicia during reading with illumination light directed from an illuminating light source;
    wherein the controller periodically energizes the illuminator to cause the illumination light to illuminate the indicia during first ones of the frames, and periodically deenergizes the illuminator to cause the illumination light not to illuminate the indicia during second ones of the frames which alternate with the first ones of the frames; and wherein the controller attempts to read the indicia in both a first image captured during the first ones of the frames and a second image captured during the second ones of the frames.

2. The reader of claim 1, wherein the housing has a presentation area, and wherein the illuminating light source is located within the housing and directs the illumination light through the presentation area to the indicia for reflection therefrom as the return light.

3. The reader of claim 1, wherein the controller is operatively connected to the imager and the illuminator, for detecting saturation in the captured image,-for turning the illumination light on and off at a flash rate, and for signaling a user by changing the flash rate upon detection of the saturation to move the housing.

4. The reader of claim 1, wherein the illuminating light source includes a light emitting diode (LED).

5. The reader of claim 1, wherein the housing has a handle for hand-held operation.

6. The reader of claim 1, wherein the housing has a base for supporting the housing on a support surface for hands-free operation.

7. A method of electro-optically reading indicia, comprising the steps of:

capturing return light from the indicia during reading with an imager to produce a captured image;

resisting reading failure due to specular reflection in the return light captured by the imager, illuminating the indicia during reading with illumination light directed from an illuminating light source;

periodically energizing the illuminating light source to cause the illumination light to illuminate the indicia during first ones of the frames, and periodically deenergizing the illuminating light source to cause the illumination light not to illuminate the indicia during second ones of the frames which alternate with the first ones of the frames; and reading the indicia in both a first image captured during the first ones of the frames and a second image captured during the second ones of the frames.

8. The method of claim 7, and configuring a housing for supporting the imager with a presentation area, and locating the illuminating light source within the housing to direct the illumination light through the presentation area to the indicia for reflection therefrom as the return light.

9. The method of claim 8, and detecting saturation in the captured image, turning the illumination light on and off at a flash rate, and signaling a user by changing the flash rate upon detection of the saturation to move the housing.

10. The method of claim 7, and forming the illuminating light source as a light emitting diode (LED).

11. The method of claim 8, and the step of holding the housing by a handle for hand-held operation.

12. The method of claim 8, and the step of supporting the housing on a support surface for hands-free operation.

* * * * *